Figure 1:
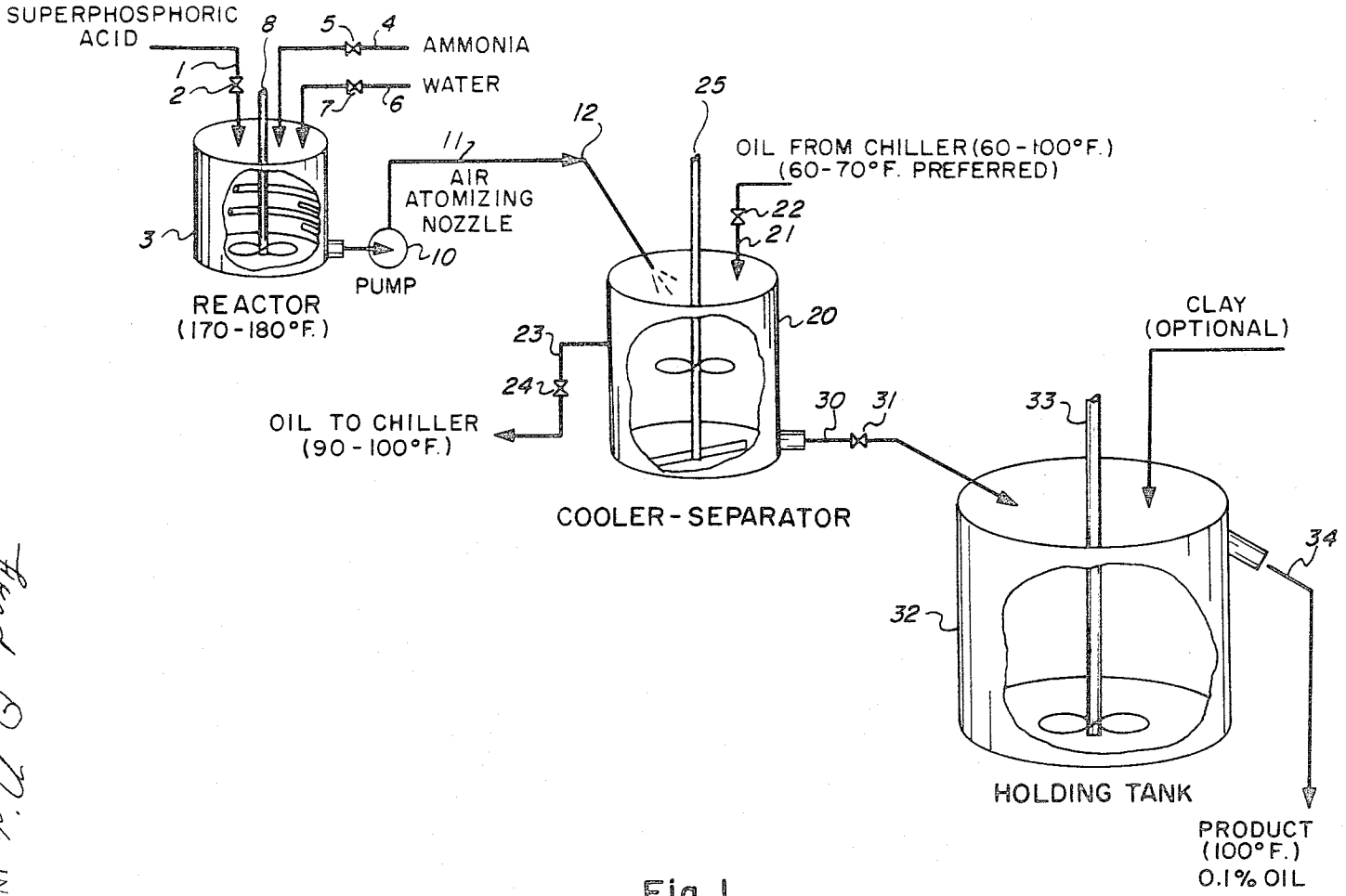
Figure 2:
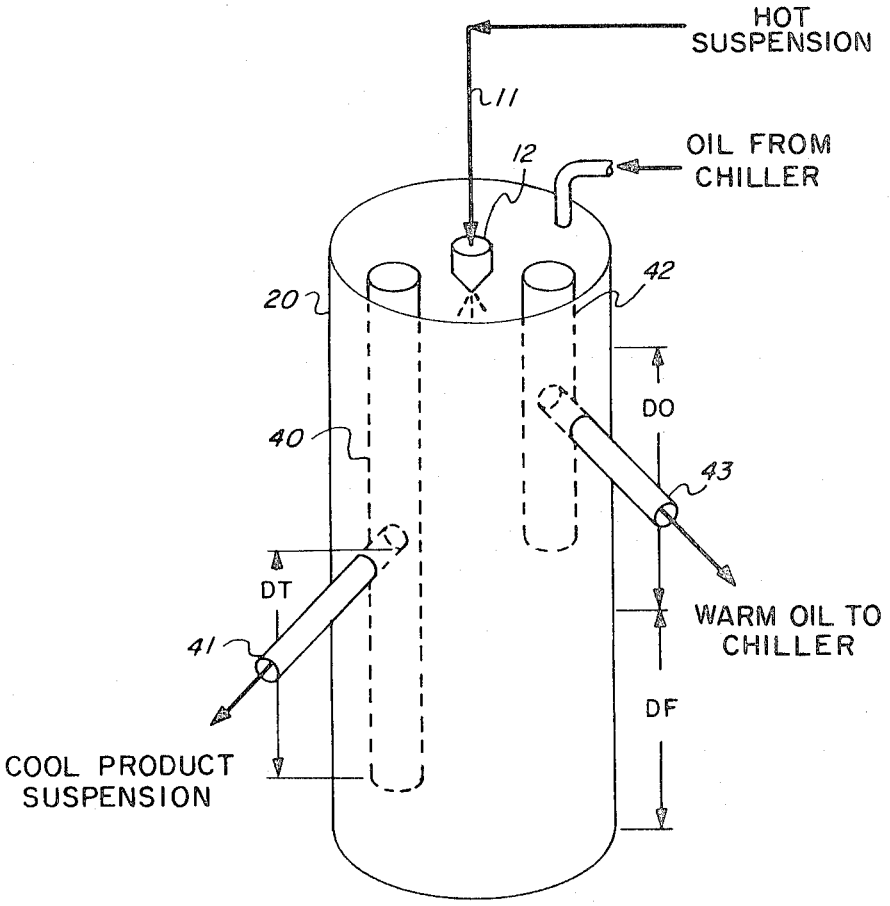
Figure 3:
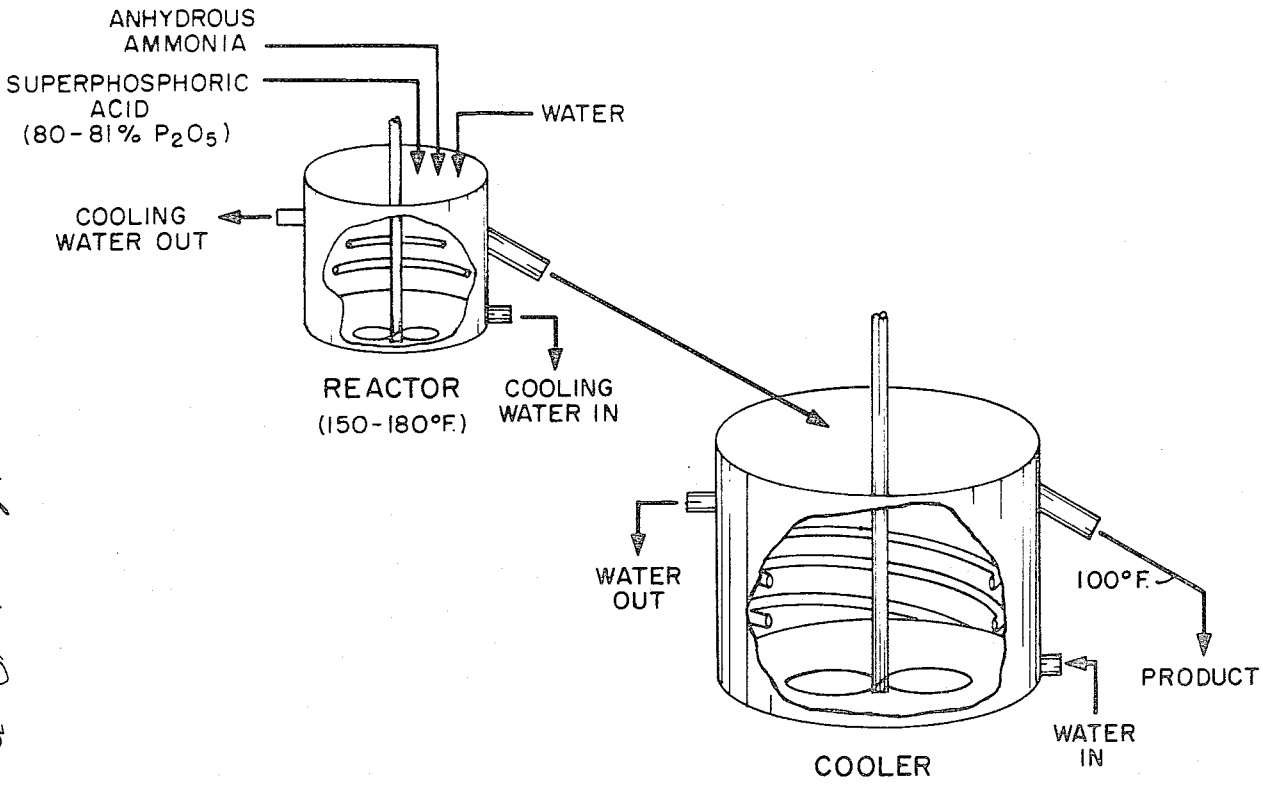
Figure 4:
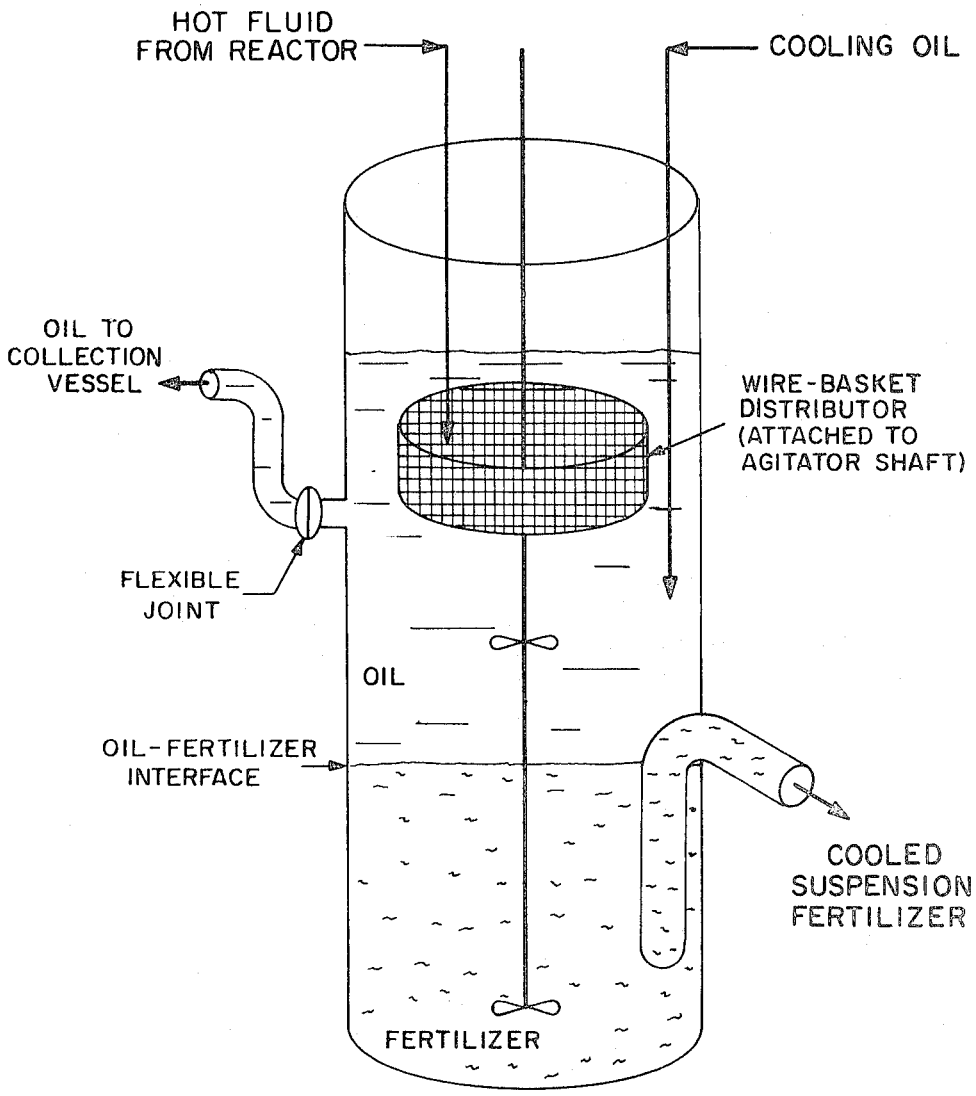

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 14, 1971

893 O.G. 403

T893,009

SELF-SUSPENDING AMMONIUM POLYPHOSPHATE SUSPENSION FERTILIZER

Fred D. Nix, Rte. 3, Phil Campbell, Ala. 35581

Continuation-in-part of application Ser. No. 836,386, June 25, 1969. This application Jan. 28, 1971, Ser. No. 110,537

Int. Cl. C01b *25/28;* C05b *7/00*

U.S. Cl. 71—34

4 Sheets Drawing. 34 Pages Specification

A process for improving the storage characteristics of ammonium polyphosphate clayless base suspension while increasing the grade up to 14–47–0 involves causing fine crystals of ammonium polyphosphate to be formed in the fresh suspension by close control of the $P_2O_5$ (80–81 percent) content of the superphosphoric acid fed thereto and quick cooling the product via water cooled heat exchange or direct contacting in a chilled fluid immiscible therewith. With this latter cooling method, spraying of the fertilizer into a specially designed cooling vessel results in an efficient cooling technique. Good storage properties result with fresh 14–47–0 products having about 80 percent of the $P_2O_5$ in polyphosphate form. The 14–47–0 can be converted easily to 11–37–0 clear solutions by ad-

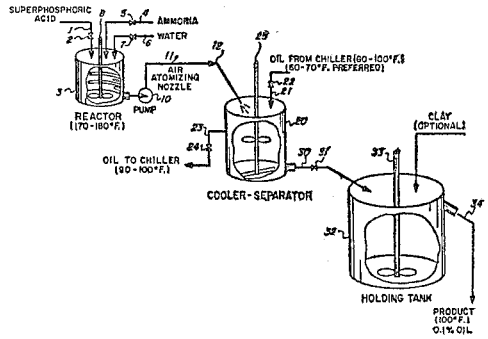

PRODUCTION OF AMMONIUM POLYPHOSPHATE SUSPENSIONS COOLING BY DIRECT CONTACT WITH OIL dition of water. As 14–47–0 contains 27 percent more plant nutrient than 11–37–0, considerable savings result in shipping and storage costs by use of 14–47–0 to produce 11–37–0 at the destination point.

SELF-SUSPENDING AMMONIUM POLYPHOSPHATE SUSPENSION FERTILIZER

Filed Jan. 28, 1971 4 Sheets-Sheet 1

PRODUCTION OF AMMONIUM POLYPHOSPHATE SUSPENSIONS
COOLING BY DIRECT CONTACT WITH OIL

Fred D. Nix INVENTOR.

BY Robert A. Petrusch

SELF-SUSPENDING AMMONIUM POLYPHOSPHATE SUSPENSION FERTILIZER

Filed Jan. 28, 1971 4 Sheets-Sheet 2

COOLER-SEPARATOR VESSEL FOR PRODUCTION OF SUSPENSION FERTILIZER WITH DIRECT-CONTACT OIL COOLING

Fred D Nix INVENTOR.

BY Robert A Petrucci

SELF-SUSPENDING AMMONIUM POLYPHOSPHATE SUSPENSION FERTILIZER

Filed Jan. 28, 1971 4 Sheets-Sheet 3

PRODUCTION OF CLAYLESS SUSPENSION FERTILIZER FROM SUPERPHOSPHORIC ACID

Fred D. Nix INVENTOR.

BY Robert A. Petrusch

COOLER-SEPARATOR VESSEL USED IN PRODUCTION OF SUSPENSION FERTILIZERS

Fred D. Nix INVENTOR.

BY Robert A. Strauch